(12) United States Patent
Gilbert

(10) Patent No.: US 6,176,704 B1
(45) Date of Patent: Jan. 23, 2001

(54) CHILDREN'S LEARNING TOY

(76) Inventor: Thomas W. Gilbert, 1436 Elmwood Ave., Lakewood, OH (US) 44107

( * ) Notice: Under 35 U.S.C. 154(b), the term of this patent shall be extended for 0 days.

(21) Appl. No.: 09/379,250

(22) Filed: Aug. 23, 1999

(51) Int. Cl.$^7$ .................................................. G09B 17/00
(52) U.S. Cl. .............................................. 434/178; 434/96
(58) Field of Search .................................. 434/81, 96, 98, 434/128, 171, 172, 208, 178; 273/157 R, 157 A

(56) References Cited

U.S. PATENT DOCUMENTS

| | | |
|---|---|---|
| 2,524,548 * | 10/1950 | Speirs ..................................... 434/172 |
| 3,427,028 | 2/1969 | Abrahamsen . |
| 3,464,145 * | 9/1969 | Martin ..................................... 434/96 |
| 4,021,939 | 5/1977 | May . |
| 4,308,016 | 12/1981 | White . |
| 4,335,879 * | 6/1982 | Wiskur .................................... 434/96 |
| 4,521,197 * | 6/1985 | Lumpkins ............................... 434/81 |
| 4,796,888 | 1/1989 | Louez . |
| 5,108,291 * | 4/1992 | Kuo ....................................... 434/208 |
| 5,487,668 * | 1/1996 | Oyen et al. ............................. 434/98 |
| 5,567,159 | 10/1996 | Tehan . |

* cited by examiner

*Primary Examiner*—Sam Rimell
(74) *Attorney, Agent, or Firm*—James A. Hudak

(57) ABSTRACT

A learning toy based upon the concept of design or pattern formation is disclosed. The toy is comprised of a tray having a transparent bottom and a plurality of blocks which are arrangeable in the tray to form a design or pattern. Each block is painted with a primary color on four of its surfaces while the fifth surface of the block is painted with two of the primary colors with the boundary therebetween being on a diagonal across the surface of the block and the sixth surface of the block is painted with the other two primary colors with the boundary therebetween being on a diagonal across the surface of the block. When the blocks are arranged in the tray to form a design or pattern, a juxtaposition of dark and light colors is created on the top surface of the blocks and an "opposite" design or pattern is formed on the bottom surfaces of the blocks which can be viewed through the transparent bottom surface of the tray.

13 Claims, 3 Drawing Sheets

CHILDREN'S LEARNING TOY

TECHNICAL FIELD

The present invention relates, in general, to a learning toy and, more particularly, to a learning toy that can be used by children or adults who have learning disabilities in order to assist them in developing reading skills through recognition of shapes, colors and forms.

BACKGROUND ART

There are many learning toys specifically designed to improve the reading skills of children. Such toys typically, however, do not utilize the concept of design or pattern formation which can be readily extended to recognizing specific letters and words. For example, U.S. Pat. No. 5,567,159 (Tehan) discloses apparatus for teaching reading and spelling skills by using a plurality of visual indicator members which represent vowels and consonants. The visual indicator members are selectively placed together to form different words. Such an approach is too advanced for pre-school children and adults who have learning disabilities since they can form designs, but not words.

U.S. Pat. No. 4,308,016 (White) discloses an educational toy which is also a puzzle. The toy comprises three sets of cubes which are color coded allowing the cubes to be assembled in a particular order. The cubes define horizontal and three vertical planes of decreasing size and are colored so as to define a pair of matching patterns in each of the planes. As such, the toy disclosed in this patent is rather complex in nature and cannot be readily used by a pre-school child or persons who have learning disabilities.

U.S. Pat. No. 4,796,888 (Louez) discloses a novelty item having a geometric shape wherein the surface of the item is divided into a plurality of areas having approximately the same configuration. The color of any one area on the item and the color of its adjacent areas are spectrally related having an angular spacing on the color wheel corresponding to the angular spacing between the normals to each of the areas and which pass through the center of the item. As such, the novelty item disclosed in this patent is rather complex in nature and cannot be readily used as a learning toy by pre-schoolers or adults who have learning disabilities.

U.S. Pat. No. 3,427,028 (Abrahamsen) discloses a word building game utilizing blocks having the same letter on its oppositely disposed sides. The objective of the game is to create words horizontally and vertically on a board. Words created in the horizontal direction will be displayed "oppositely" on the opposite side of the board, whereas words spelled in the vertical direction will be shown the same on both sides of the board. Here again, the game disclosed in this patent requires the formation of words which is impossible for pre-school children and adults who have learning disabilities.

In view of the lack of learning toys utilizing the concept of design or pattern formation and which can be readily used by pre-schoolers and adults who have learning disabilities, it has become desirable to develop such a learning toy based upon the aforementioned concept.

SUMMARY OF THE INVENTION

The present invention solves the problems associated with the prior art learning toys and other problems by providing a learning toy based upon the concept of design or pattern formation. As such, the toy is comprised of a plurality of blocks which form an array in a tray that has a Plexiglas or transparent bottom. Each block is painted with the primary colors of blue, red, yellow and white on four of its sides while the fifth side of the block is painted blue and yellow with the boundary therebetween being on a diagonal across the side of the block and the sixth side of the block is painted red and white with the boundary therebetween being on a diagonal across the side of the block. When the blocks are placed in the tray and arranged to form a design or pattern, a juxtaposition of dark and light colors is created, i.e., the design or pattern formed on the top surfaces of the blocks is "opposite" to the design or pattern formed on the bottom surfaces of the blocks and viewed through the Plexiglas or transparent bottom surface of the tray.

DESCRIPTION OF THE PREFERRED EMBODIMENT

Figure 1:
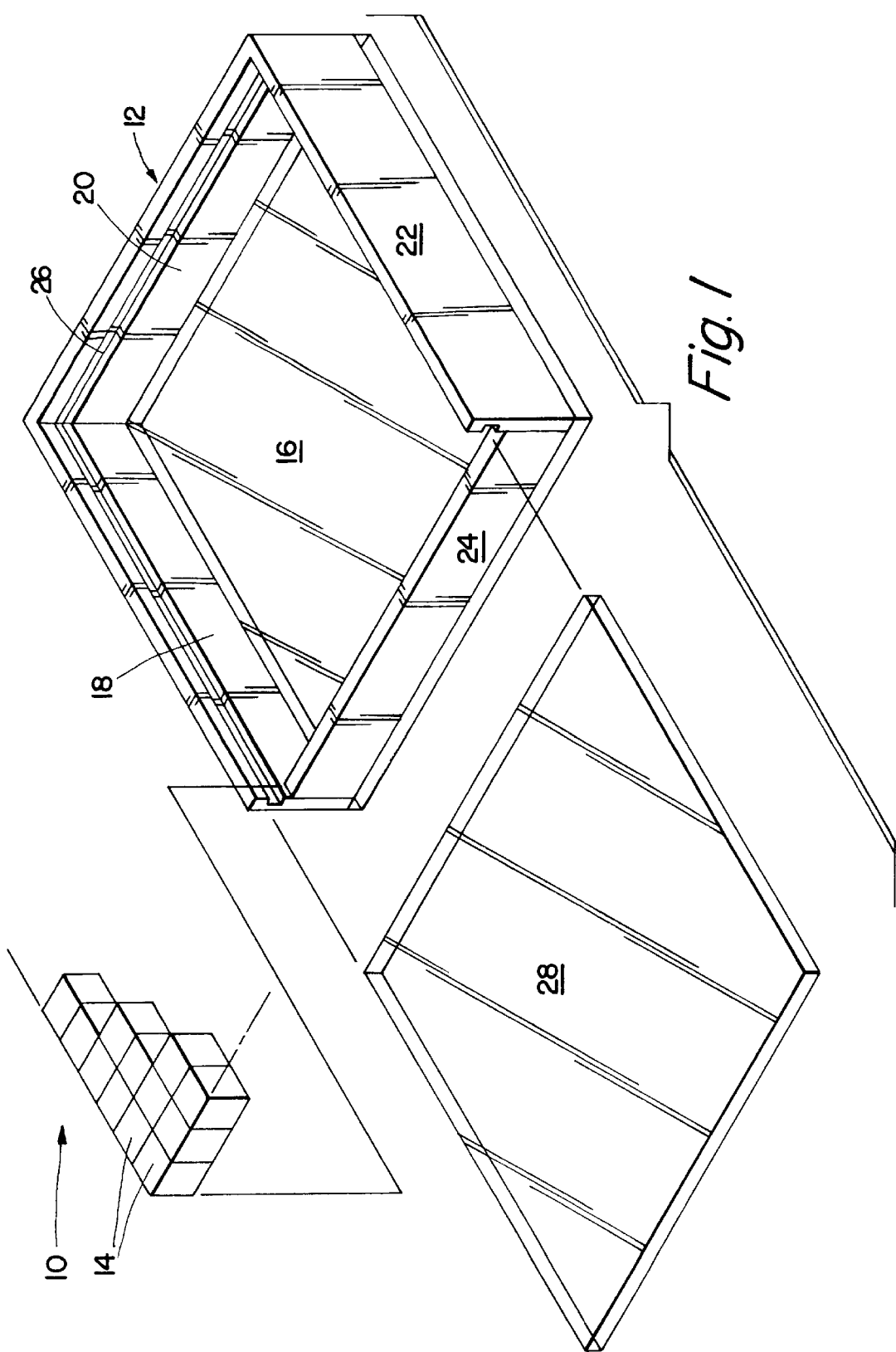
FIG. 1 is perspective view of the learning toy of the present invention illustrating the tray and the plurality of multi-colored blocks which are arranged in the tray to form a pattern or design.

Referring now to the drawings where the illustrations are for the purpose of describing the preferred embodiment of the present invention and are not intended to limit the invention disclosed herein, FIG. 1 is a perspective view of the learning toy 10 of the present invention comprising a tray 12 which holds a plurality of multi-colored blocks 14. The tray 12 is generally square in configuration and includes a base member 16 and side members 18, 20, 22 and 24 along the outer edges of base member 16. The base member 16 is typically formed from a Plexiglas or transparent material. The side members 18, 20, 22 and 24 are typically formed from wood or similar material. Side members 18, 20 and 22 are of the same height and each has a laterally extending groove 26 on the inner surface thereof and adjacent their respective top edge. The height of side member 24 is slightly less than that of side members 18, 20 and 22 permitting a Plexiglas cover or top 28 to be inserted within groove 26 on the inner surface of side members 18, 20 and 22. The inner dimensions of tray 12 are approximately 13.25 inches by 13.25 inches and the height of each of the side members 18, 20 and 22 is approximately 1.75 inches whereas the height of side member 24 is approximately 1.375 inches.

Each of the blocks 14 is cube-shaped and measures approximately 1.125 inches on each of its sides. A total of 144 of the blocks 14 are utilized for the learning toy 10. Each block 14 is painted with the primary colors of blue, red, yellow and white on four if its surfaces. The fifth surface of the block 14 is painted blue and yellow with the boundary therebetween being on a diagonal across the surface of the block making two substantially equal blue and yellow isosceles triangles. Similarly, the sixth surface of the block 14 is painted red and white with the boundary therebetween being on a diagonal across the surface of the block making two substantially equal red and white isosceles triangles.

Figure 2:
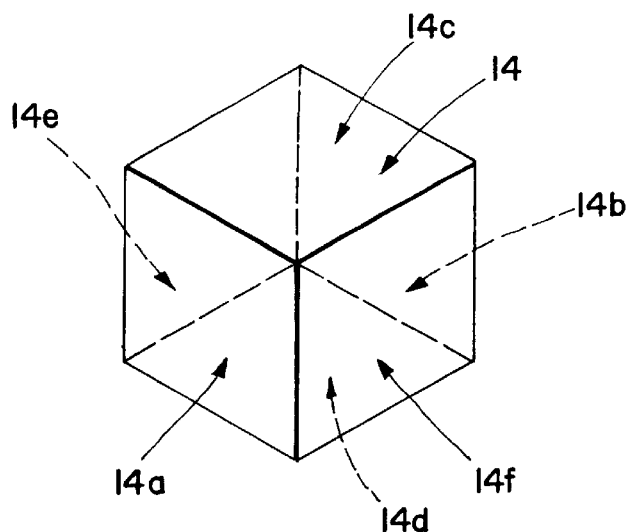
FIG. 2 is a perspective view of a block utilized by the present invention.
Figure 3A:
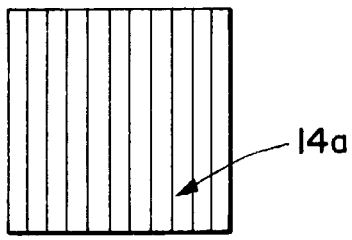
FIGS. 3a, 3b, 3c, 3d, 3e and 3f are various views of the surfaces of the block, shaded to represent color, utilized by the present invention.
Figure 3B:
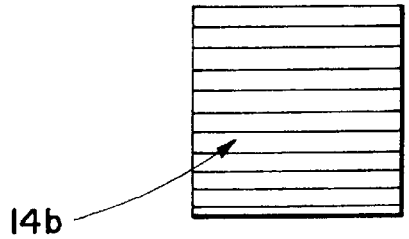
Figure 3C:
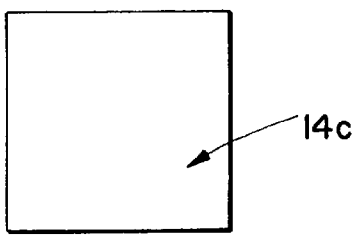
Figure 3D:
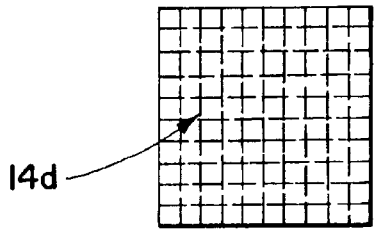
Figure 3E:
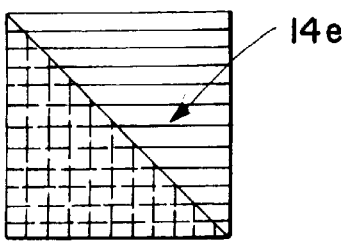
Figure 3F:
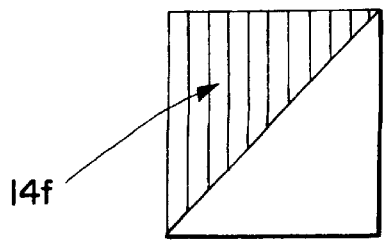

Referring now to FIG. 2, a perspective view of a block 14 is shown along with views of each of its sides or surfaces, shown in FIGS. 3a, 3b, 3c, 3d, 3e and 3f, and shaded to represent color. If the block 14 is viewed from its front, the front surface 14a as shown in FIG. 3a is painted red, the rear surface 14b as shown in FIG. 3b is painted blue, the top surface 14c as shown in FIG. 3c is painted white, the bottom surface 14d as shown in FIG. 3d is painted yellow, the left side surface 14e as shown in FIG. 3e is painted blue and yellow with the boundary therebetween being on a diagonal and the right side surface 14f as shown in FIG. 3f is painted red and white with boundary therebetween being on a diagonal. As shown in FIG. 3e, which is a view of the left side surface 14e of the block 14, the short sides of the blue isosceles triangle touch or border the solid white and solid red surfaces of the top and front surfaces 14c and 14a, respectively, of the block 14, whereas the short sides of the yellow isosceles triangle touch or border the solid yellow and blue surfaces of the bottom and rear surfaces 14d and 14b, respectively, of the block 14. As shown in FIG. 3f, which is a view of the right side surface of the block 14, the short sides of the red isosceles triangle touch or border the solid white and solid red surfaces of the top and front surfaces 14c and 14a, respectively, of the block 14, whereas the short sides of the white isosceles triangle touch or border the solid yellow and solid blue surfaces of the bottom and rear surfaces 14d and 14b, respectively, of the block 14. The painting of the surfaces on each block 14 is the same. The reason for the color pattern on each of the blocks 14 is that the four primary colors, i.e., blue, red, yellow and white, can be viewed as being in an order from the darkest color to the lightest color. The two darkest colors, red and blue, are placed on opposite sides of each block 14, such as the front surface and the rear surface, whereas the two lightest colors, yellow and white, are placed on the opposite surfaces, such as the bottom surface and the top surface of the block. In this manner, a juxtaposition of dark and light colors is created when the blocks are arranged in the tray 12 and the tray 12 is subsequently inverted. In like manner, the surfaces of the block 14 that contain dual colors of blue and yellow or red and white are matched so that the darkest color, blue, is matched with the second to lightest color, yellow, and the second darkest color, red, is matched with the lightest color, white, so that when the tray 12 containing blocks 14 that have been arranged so that the top surfaces of the blocks create a design or pattern and the tray with the blocks therein is inverted, an "opposite" design or pattern is created on the bottom surfaces of the blocks.

Figure 4:
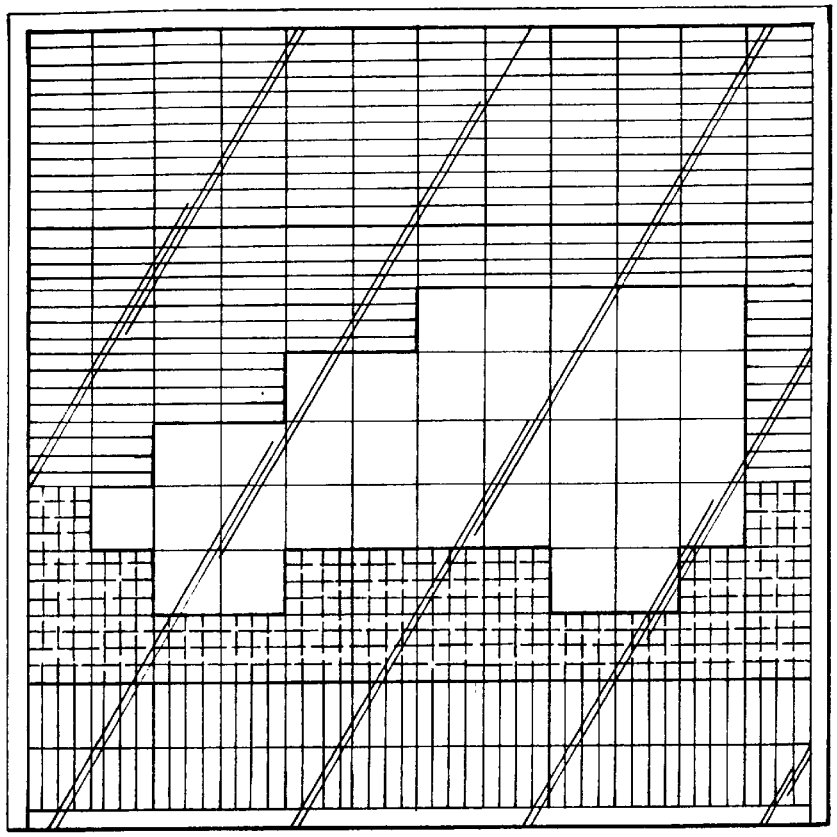
FIG. 4 is a top plan view of the tray with the blocks being arranged therein so that the top surfaces of the blocks, shaded to represent color, form a design or pattern.
Figure 5:
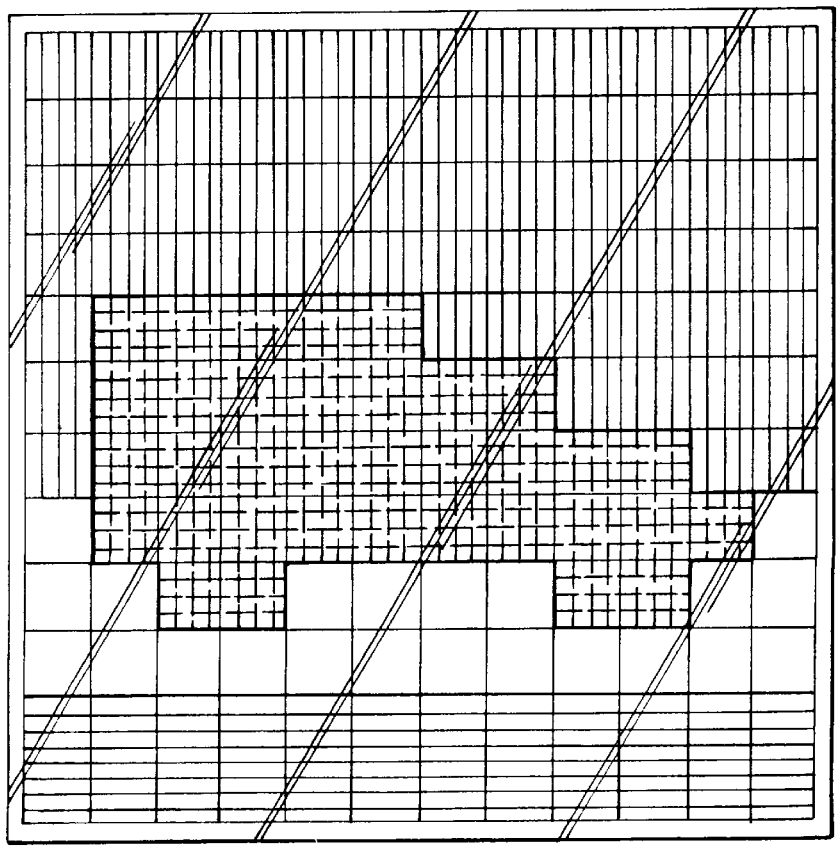
FIG. 5 is a bottom plan view of the tray with the blocks being arranged therein as in FIG. 4 and showing that the design or pattern on the bottom surfaces of the blocks, shaded to represent color, is the "opposite" of the design or pattern shown on the top surfaces of the blocks shown in FIG. 4.

In order to utilize the toy 10, the blocks 14 are placed within the tray 12 so that twelve rows of blocks 14 are formed, each row containing twelve blocks 14. The blocks are arranged so that a design or pattern is created, such as that shown in FIG. 4 wherein the shading represents the color of the top surfaces of the blocks 14. The top Plexiglas cover 28 is then inserted into groove 26 in side members 18, 20 and 22 and the tray 12, with the blocks 14 therein, is inverted resulting in a "mirror" image of the design or pattern being displayed by the bottom surfaces of the blocks 14 through base member 16 of the tray 12, however, the coloration of the design or pattern is "opposite" to that which was originally formed, as shown in FIG. 5 wherein the shading represents the color of the bottom surfaces of the blocks 14.

The reasoning behind the usage of a twelve by twelve block array is that a great number of designs or patterns are possible as shown through the use of arithmetic combinations of six sets of two, or four sets of three, or three sets of four, or two sets of six or variations of the aforementioned combinations. The next greater number of blocks giving such combinations would be a twenty-four by twenty-four block array which is too large to be practical. The next smaller number of blocks, which would not provide as many design or pattern possibilities, would be a six by six block array, however, the size of such an array limits the possibility for abstract or artistic expression by the person using the toy 10.

The objective of the toy 10 of the present invention is to create designs, pictures, patterns and/or words from past experiences or patterned examples in order to experiment with simple to complex shapes, colors and forms. It is known that pre-literacy experiences necessarily involve the manipulation and ordering of sizes, shapes and colors in order to detect similarities and differences for the future deciphering of letters, words and sentence formations. The activity provided by this toy 10 should help with literacy development at a very fundamental and yet progressively more discreet level as the manipulation of the blocks 14 becomes more highly sophisticated. Since the literacy process generally follows a consistently uniform developmental progression, the toy 10 will be perfectly functional for all age individuals regardless of their abilities or disabilities.

Because of the manner in which printed letters are formed with the use of straight lines, curves, and combinations of straight lines and curves, it is very important for individuals to become familiar with the print media through experiences involving manipulating lines and forms in unfamiliar patterns. The letters "p", "b", "d", and "q" are basically the same letter but in different orientations. Similarly, the letters "w", "y", "u", and "v" have upwardly extending cup-shaped lines and curves, whereas the letters "m", "n", "h", and "r" have downwardly extending cup-shaped lines and curves. In addition, there are similarities in shape between the letters "t", "l", "f" and between the letters "o", "c", "e", and "a". Also, the similarities between the letters "i" and "j" and between the letters "x" an "k" all demonstrate that detecting the subtle differences in the shape of letters takes an ability to recognize similar and dissimilar forms and shapes in different positions in space. In addition to there being similarity between the shape of certain letters, there is similarity in the overall visual appearance of words, such as "of" and "to", "cat" and "eat", and "cleared" and "cleaned". The foregoing are merely some examples which demonstrate that combinations of small shapes to make larger shapes often necessitate the capacity to recognize subtle differences in small and large word formations.

The use of the toy 10 of the present invention allows the user to place, displace, arrange and rearrange any or all of the blocks 14 giving the user countless opportunities to experience shape, color and design formation. This type of activity should be a supplementary and complementary skill-based activity relating to reading and writing comprehension and ability formation. It also provides a fine artistic medium for individual or copied expression.

Certain modifications and improvements will occur to those skilled in the art upon reading the foregoing. It is understood that all such modifications and improvements have been deleted herein for the sake of conciseness and readability, but are properly within the scope of the following claims.

I claim:

1. A children's learning toy comprising a tray and a plurality of blocks, each block being cube shaped with surfaces having substantially equal areas, each of said surfaces having a different color or color combination thereon, the coloration of all of said blocks being identical with each of four contiguous surfaces of each of said blocks being a solid color and with each of two non-contiguous surfaces of each of said blocks being multi-colored, said blocks being receivable in said tray and being arrangeable therein to form a design or pattern.

2. The toy as defined in claim 1 wherein said tray is comprised of a bottom member, upwardly extending side members attached to said bottom member, and a top member slidably received in said side members.

3. The toy as defined in claim 1 wherein said tray has a substantially square configuration.

4. The toy as defined in claim 2 wherein said bottom member of said tray is formed from a transparent material.

5. The toy as defined in claim 2 wherein said top member of said tray is formed from a transparent material.

6. The toy as defined in claim 1 wherein said contiguous surfaces of said block are each a primary color.

7. The toy as defined in claim 6 wherein two of said contiguous surfaces of said block are each a dark primary color, said two of said contiguous surfaces being oppositely disposed to one another.

8. The toy as defined in claim 7 wherein one of said two of said contiguous surfaces is red while the other of said two of said contiguous surfaces is blue.

9. The toy as defined in claim 8 wherein each of the other two of said contiguous surfaces of said block are a lighter primary color, said other two of said contiguous surfaces being oppositely disposed to one another.

10. The toy as defined in claim 9 therein one of said other two of said contiguous surfaces is white while the other of said two of said contiguous surfaces is yellow.

11. The toy as defined in claim 1 wherein said multi-colored non-contiguous surfaces of said block are colored with the primary colors.

12. The toy as defined in claim 11 wherein one of said multi-colored, non-contiguous surfaces of said block is red and white and the other of said multi-colored, non-contiguous surfaces is blue and yellow.

13. The toy as defined in claim 12 wherein said colors on said multi-colored, non-contiguous surfaces of said block are separated from one another along a diagonal across said surface of said block.

* * * * *